(12) United States Patent
Heidl

(10) Patent No.: US 9,974,339 B2
(45) Date of Patent: May 22, 2018

(54) VAPORIZER DEVICE WITH IMPROVED THREADED CONNECTION

(71) Applicant: National Concessions Group Inc., Denver, CO (US)

(72) Inventor: Jeremy Heidl, Denver, CO (US)

(73) Assignee: NATIONAL CONCESSIONS GROUP INC., Denver, CO (US)

( * ) Notice: Subject to any disclaimer, the term of this patent is extended or adjusted under 35 U.S.C. 154(b) by 0 days. days.

(21) Appl. No.: 15/288,381

(22) Filed: Oct. 7, 2016

(65) Prior Publication Data

US 2017/0099879 A1    Apr. 13, 2017

Related U.S. Application Data

(60) Provisional application No. 62/238,544, filed on Oct. 7, 2015.

(51) Int. Cl.
*A24F 47/00* (2006.01)
*F16L 15/00* (2006.01)

(52) U.S. Cl.
CPC ............ *A24F 47/008* (2013.01); *F16L 15/00* (2013.01)

(58) Field of Classification Search
CPC ........... A24F 47/008; F16B 21/04; F16B 5/10
See application file for complete search history.

(56) References Cited

U.S. PATENT DOCUMENTS

| 1,987,474 | A | * | 1/1935 | Grant | F16B 25/0078 411/417 |
| 7,344,346 | B2 | * | 3/2008 | Hsu | F16B 21/02 411/21 |
| 9,615,605 | B2 | * | 4/2017 | Liu | A24F 47/008 |
| 2006/0115346 | A1 | * | 6/2006 | Huang | F16B 15/06 411/418 |
| 2014/0261493 | A1 | * | 9/2014 | Smith | A24F 47/008 131/328 |
| 2016/0183596 | A1 | * | 6/2016 | Rado | A24F 47/008 392/395 |
| 2016/0286860 | A1 | * | 10/2016 | Flayler | A24F 47/008 |
| 2017/0027224 | A1 | * | 2/2017 | Volodarsky | A24F 47/008 |

* cited by examiner

*Primary Examiner* — Briggitte R Hammond
(74) *Attorney, Agent, or Firm* — Sheridan Ross P.C.

(57) ABSTRACT

An electronic vaporizer device is provided for vaporizing or atomizing inhalants. The device comprises a separable and selectively connectable device having at least a first portion and a second portion. A novel threaded connection arrangement is provided with a male connector and a female connector. The male connector comprises a thread arrangement that is compatible with various devices. The female connector is adapted to receive only the male connectors of the disclosure.

20 Claims, 5 Drawing Sheets

VAPORIZER DEVICE WITH IMPROVED THREADED CONNECTION

This U.S. Non-Provisional Patent Application claims the benefit of priority from U.S. Provisional Patent Application Ser. No. 62/238,544, filed Oct. 7, 2015, the entire disclosure of which is hereby incorporated by reference.

FIELD

The present disclosure generally relates to vaporizer devices, components thereof and assembly methods. More specifically, the present disclosure provides a unique connection system for components of electronic vaporizers.

BACKGROUND

Conventional smoking methods and devices are characterized by igniting a substance, and inhaling smoke resulting from the combustion of that substance. Smoking can cause serious health issues, including respiratory system diseases and cancer. Despite known risks, however, smoking remains a popular method for inhaling chemicals and other substances, such as nicotine, various herbs and tetrahydrocannabinol (THC), to name a few.

In recent years, the electronic cigarette or "e-cigarette" has seen increased use and acceptance as an alternative to traditional smoking methods. A liquid or oil is provided and a heating element vaporizes the oil and the resulting vapor is inhaled. In some of these devices, the oil is provided in a replaceable cartridge. When the cartridge is empty, it is removed and replaced with a full cartridge. The oil cartridge will include a connector that mates with a complementary connector associated with the e-cigarette. The ability to replace cartridges in existing devices is typically provided, at least in part, by the provision of a male element on a cartridge and a female element on a remainder of the device to which the cartridge is to be connected, or vice-versa. These connections elements have heretofore been provided as standard threaded elements that are not specific or customized to any particular device. Therefore, cartridges, pens and vaporizers have been known to comprise interchangeable parts without any physical restrictions on combining a specific cartridge with a pen or vaporizer of a different make, intended use, etc.

SUMMARY

It is an object of the present disclosure to provide a vaporizer device with at least two detachable components, and wherein the detachable components are selectively connected by means of complementary threaded members. In different embodiments the detachable components include a cartridge or container holding a substance to be vaporized, an atomizer, a battery, a mouth piece, lighting elements and other status indicators, and circuitry, for example.

It is another object of the present disclosure to provide a connection system with a novel thread arrangement whereby a uniquely configured female threaded member and a complementary and uniquely configured male threaded member mate to form a mechanical connection in some embodiments and a mechanical and electrical connection in other embodiments.

It is another object of the present disclosure to provide a uniquely configured male threaded member that not only mates with a complementary uniquely configured female threaded member to provide a level of security in interconnecting components, but is also uniquely configured to mate with various standard female threaded features to provide legacy compatibility with existing connectors.

It is yet another object of embodiments of the present disclosure to provide a vaporizer device comprising a main body portion and a replaceable cartridge portion. In preferred embodiments, the main body portion is capable of receiving only a particular type of cartridge based on a novel connector system of the present disclosure. For example, the novel male threaded member being provided on one of the main body portion and the cartridge and the novel female threaded member being provide on the other.

In certain embodiments, a first connector or male threaded portion is provided comprising first and second externally threaded portions. The first and second externally threaded portions comprise discrete non-contiguous arcuate segments. In preferred embodiments the arcuate threaded segments are in an opposing relationship separated by substantially planar segments. The complimentary second connector or female threaded members for receiving the male threaded portion of such embodiments comprise an aperture generally corresponding to the two dimensional profile of the bottom surface of the male portion. Inside of the aperture, on the interior surface of the second connector, is a complimentary set of non-continuous arcuate threaded segments oriented to mate with the male threaded portions of the first connector. As used herein, such apertures are occasionally referred to slotted apertures. The size and shape of such apertures preclude passage of male connectors having a profile larger than the dimensions of the aperture. For example, a male threaded portion comprising a conventional, cylindrical threaded surface dimensioned to mate with the female connector threaded segments is unable to pass through the aperture.

Embodiments of the present disclosure contemplate various arrangements and shapes of male threaded portions and corresponding female members. Although certain embodiments shown and described herein comprise a pair of opposing threaded portions and a pair of substantially planar non-threaded portions, various alternative arrangements are contemplated. For example, a male extension comprising a cross shape (e.g. +) is provided wherein distal ends and termini of the shape comprise external threads. Corresponding female portions comprise corresponding recesses to enable connection of the shape while preventing other shapes from being received. It will be expressly recognized, therefore, that the disclosure is not limited to the shapes and orientations provided in the drawings and that various non-circular shapes are contemplated for use with both male and female threaded portions.

Devices and features in furtherance of these objects are shown and described herein. In one embodiment, an electronic vaporizer device for vaporizing inhalants is provided, the device comprising a first member comprising a mouthpiece and an elongate body portion extending therefrom. A second member is provided comprising a proximal end, a distal end and an elongate length extending between the proximal end and the distal end. The first member and the second member are selectively connectable components wherein the proximal end of the second member is connectable to the first member at an end opposing the mouthpiece. At least one of the first member and the second member comprise a male threaded member having a non-circular outer perimeter, the male threaded member comprises a first externally threaded portion and a second externally threaded portion, and the first externally threaded portion and the second externally threaded portion are provided in opposing relationship. At least one of the first member and the second member comprise a female threaded member, the female threaded member comprises a slotted aperture for receiving the male threaded member and first and second female threaded portions, the female threaded portions are spaced apart and provided in opposing relationship.

In yet another embodiment, an electronic vaporizer device for vaporizing inhalants is provided, the device comprising a first member comprising a mouthpiece and an elongate body portion extending therefrom. A second member comprises a proximal end, a distal end and an elongate length extending between the proximal end and the distal end. The first member and the second member comprise selectively connectable components wherein the proximal end of the second member is connectable to the first member at an end opposing the mouthpiece. The second member comprises a male threaded member having a non-circular outer perimeter, the male threaded member comprising a first externally threaded portion and a second externally threaded portion, the first externally threaded portion and the second externally threaded portion are provided in opposing relationship and have a radius of curvature. The first member comprises an aperture for receiving the male threaded member, and a female threaded member. The female threaded member comprises first and second threaded portions being spaced apart and provided in opposing relationship, the first and second threaded portions are adapted to receive and engage the first externally threaded portion and the second externally threaded portion of the male threaded member.

In yet another embodiment, an electronic vaporizer device for vaporizing inhalants is provided, the device comprising a first member comprising an elongate body portion and a second member comprising a proximal end, a distal end and an elongate length extending between the proximal end and the distal end. The first member and the second member comprise selectively connectable components wherein the proximal end of the second member is connectable to the first member, the first member comprises a first externally threaded portion and a second externally threaded portion. The first externally threaded portion and the second externally threaded portion are provided in opposing relationship and have a radius of curvature. Each of the first and second externally threaded portions comprise an arc, wherein each of the arcs terminate at an intersection with a substantially planar surface, and wherein the first and second externally threaded portions are spaced apart by a length of the substantially planar surface. The second member comprises an aperture for receiving at least a portion of the first member, and a female threaded member. The female threaded member comprises first and second threaded portions being spaced apart and provided in opposing relationship, the first and second threaded portions adapted to receive and engage the first externally threaded portion and the second externally threaded portion of the male threaded member.

In another embodiment, an electronic vaporizer device for vaporizing inhalants is provided wherein the device comprises a first member comprising a mouthpiece and an elongate body portion extending therefrom. A second member is provided that comprises a proximal end, a distal end and an elongate length extending between the proximal end and the distal end. The first member and the second member comprise selectively connectable components wherein the proximal end of the second member is connectable to the first member at an end opposing the mouthpiece. At least one of the first member and the second member comprise a male threaded member having a non-circular outer perimeter, and the male threaded member comprises a first externally threaded portion and a second externally threaded portion. At least one of the first member and the second member comprises a female threaded member, and the female threaded member comprises a slotted aperture for receiving the male threaded member. The female threaded member comprises first and second female threaded portions, the female threaded portions being spaced apart and provided in opposing relationship.

In another embodiment, an electronic vaporizer device for vaporizing inhalants is provided, wherein the device comprises a first member comprising a mouthpiece and an elongate body portion extending therefrom. A second member comprises a proximal end, a distal end and an elongate length extending between the proximal end and the distal end. The first member and the second member comprise selectively connectable components wherein the proximal end of the second member is connectable to the first member. The first member comprises a male threaded member having a non-circular outer perimeter, and the male threaded member comprises a first externally threaded portion and a second externally threaded portion, the first externally threaded portion and the second externally threaded portion provided in opposing relationship and having a radius of curvature. The second member comprises an aperture for receiving the male threaded member, and a female threaded member. The female threaded member comprises first and second threaded portions being spaced apart, the first and second threaded portions adapted to receive and engage the first externally threaded portion and the second externally threaded portion of the male threaded member.

In another embodiment, an electronic vaporizer device for vaporizing inhalants is provided, wherein the device comprises a first member comprising an elongate body portion, a second member comprising a proximal end, a distal end and an elongate length extending between the proximal end and the distal end. The first member and the second member comprising selectively connectable components. The first member comprises a first externally threaded portion and a second externally threaded portion, the first externally threaded portion and the second externally threaded portion provided in a spaced apart arrangement and on opposite sides of the first externally threaded portion. Each of the first and second externally threaded portions comprise an arc, wherein each of the arcs terminate at an intersection with a substantially planar surface, and wherein the first and second externally threaded portions are spaced apart by a length of the substantially planar surface. The second member comprises an aperture for receiving at least a portion of the first member, and a female threaded member. The female threaded member comprises first and second threaded portions being spaced apart and provided in opposing relationship, the first and second threaded portions adapted to receive and engage the first externally threaded portion and the second externally threaded portion of the male threaded member.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

BRIEF DESCRIPTION OF THE DRAWINGS

The accompanying drawings, which are incorporated in and constitute a part of the specification, illustrate embodiments of the disclosed system and together with the general description of the disclosure given above and the detailed description of the drawings given below, serve to explain the principles of the disclosed system.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular system embodiments illustrated herein.

DETAILED DESCRIPTION

Figure 1:
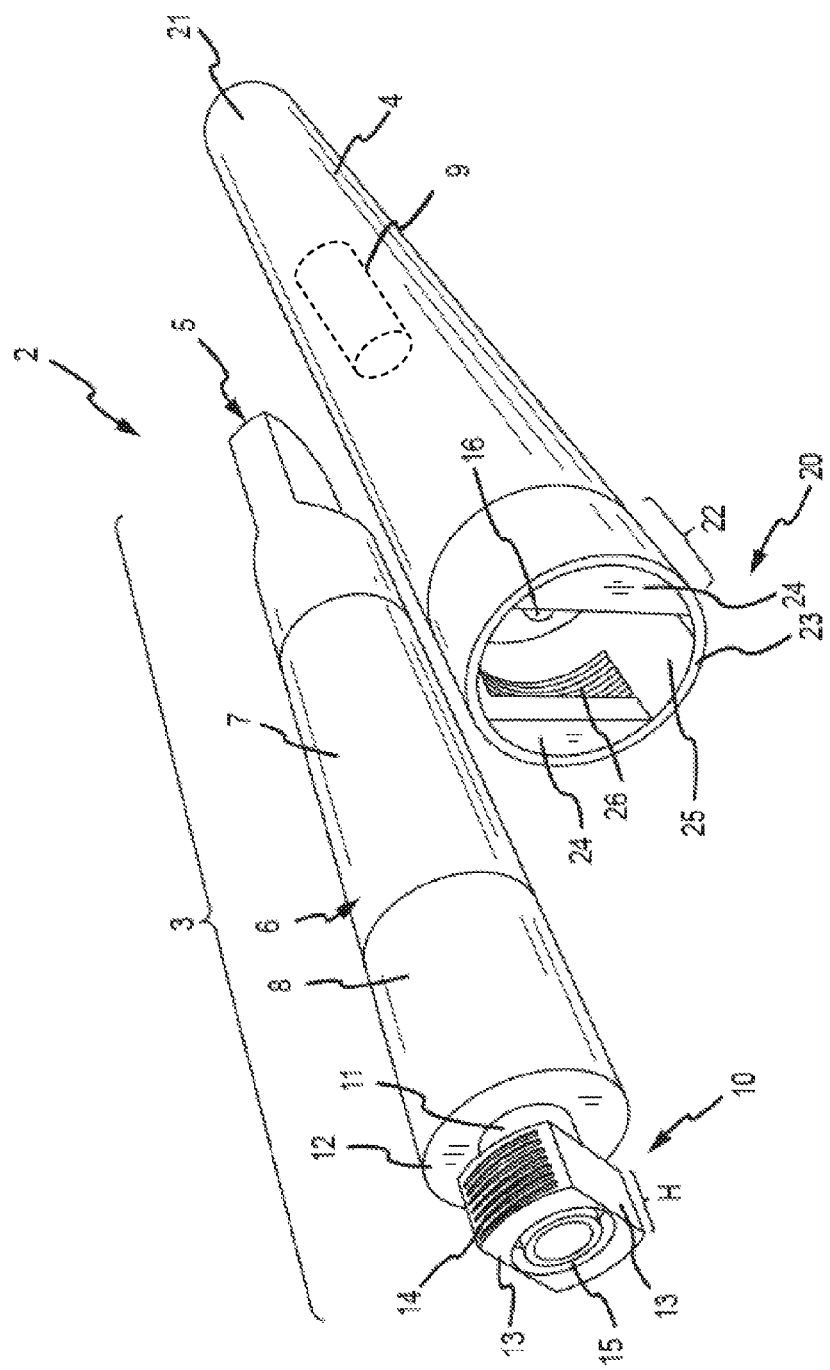
FIG. 1 is a front perspective view of a vaporizer device according to one embodiment of the present disclosure, the device being provided in a disassembled state.

FIG. 1 is a front perspective view of a vaporizer device 2 according to an embodiment of the present disclosure, the device being provided in a disassembled state. As shown, the device 2 comprises a first member 3 and a second member 4. The first member 3 and second member 4 are adapted for selective engagement with one another. In preferred embodiments, the first member 3 comprises a user-interface 5. The user-interface 5 preferably comprises a mouthpiece adapted for ergonomic interaction with the mouth of a user and adapted to promote a preferred airflow to a user of the device. Although the user-interface 5 of FIG. 1 is shown as comprising a particular shape, it will be recognized that any number of shapes and styles of user-interfaces and mouthpieces may be employed with embodiments of the present disclosure and may be removable and substitutable. The user-interface 5 extends from a body portion 6 of the first member 3. The body portion 6 of the first member 3 comprises a substantially cylindrical cross-section. In various embodiments it is contemplated that the first member 3 comprises a replaceable and/or refillable cartridge for housing a substance to be vaporized. Such substances include, but are not limited to various oils, extracts, liquids, and solids suitable for use with a vaporizer device. In the depicted embodiment, the first member 3 comprises a cartridge portion 7 with an interior volume for housing substances to be vaporized, and a vaporizer portion 8 comprises vaporizer components including, but not limited to an atomizer device and/or heating element. In various embodiments, the cartridge portion 7 and vaporizer portion 8 may be selectively detached from one another. In the embodiment of FIG. 1, however, the first member 3 comprises a single unit that is not intended to be disassembled.

As further shown in FIG. 1, the first member 3 further comprises a first connector 10 in the form of a male extension for connecting the first member 3 to the second member 4. As shown, the first connector or male extension 10 extends from the vaporizer portion 8 of the first member 3 and comprises a neck portion 11 extending from an annular surface 12 of the first member 3. The male extension 10 further comprises a polygonal outer surface comprising first and second spaced apart planar members 13, and first and second spaced apart male threaded portions 14 extending between and joining the planar members 13. In an alternative embodiment, the planar members 13 need not be parallel and need not be planar. The male extension 10 further comprises a contact 15 for interconnecting the first member 3 to a complementary contact 16 associated with the second member 4. The contact(s) is/are, in turn, interconnected to a battery within the interior of second member 4. The contact 15 is shown as an annular contact member in FIG. 1, but various shapes and orientations of contact members may be provided with various embodiments of the present disclosure.

FIG. 1 further depicts the second member 4 of the vaporizer device 2. As shown, the second member 4 comprises a substantially cylindrical cross-section of substantially constant diameter. The second member 4 comprises a first end 20 and a second end 21. The first end 2—is adapted to connect to the male extension 10 of the first member 3 as shown and described herein. The second end 21 generally comprises a distal end of the device 2 when the first member 3 and the second member 4 are provided in an assembled state. The first end 20 comprises a second connector 22 that mates with the first connector 10 associated with the first member 3. The second connector 22 comprises an outer annular ring or wall 23, and a pair of inwardly extending opposing flanges 24 that define a slotted aperture 25. A non-continuous or interrupted female threaded portion 26 is provided on an interior surface of the second connector 22 and interior to the slotted aperture 25. The second connector 22 of this embodiment thus varies from known female threaded connection members for vaporizer devices which are typically circular openings comprising continuous threads on an internal cylindrical surface. The slotted aperture 25 is sized to receive the male extension 10 of the first member 3. The opposing male threaded portions 14 of the male extension 10 are configured to mate with the female threaded portion 26 of the second member 4. Although the first connector 10 and second connector 22 are provided at distal ends of their respective members, it will be recognized that connectors of the present disclosure may be provided at various locations and may secure various members and features together. The connector construction(s) of FIG. 1 are thus not limiting and various alternatives are contemplated.

Additionally, the male threaded portions 14 are configured to mate with preexisting or standard female threaded portions, including those provided within continuous internal threads of devices not shown herein. However, existing male threaded portions which generally comprise 360-degree external threads are prevented from fitting within the slotted aperture 25 of the second connector 22 of the present disclosure. A particular advantage of the present disclosure is thereby provided wherein a universal male threaded portion is provided that mates with the second connector 22 as shown, and also mates with pre-existing devices comprising conventional arrangements. Additionally, known male members will not work with second connector 22 of the second members 4 and related components as shown and described herein. As the first member 3 generally comprises a replaceable cartridge and the second member 4 generally comprises a non-disposable device including valuable features such as circuitry, logic, and rechargeable power components, embodiments of the present disclosure provide a replaceable first member 3 that is adapted to work with and is compatible with the second member 4 as shown and described herein and that is also suitable for use with existing devices.

Figure 2:
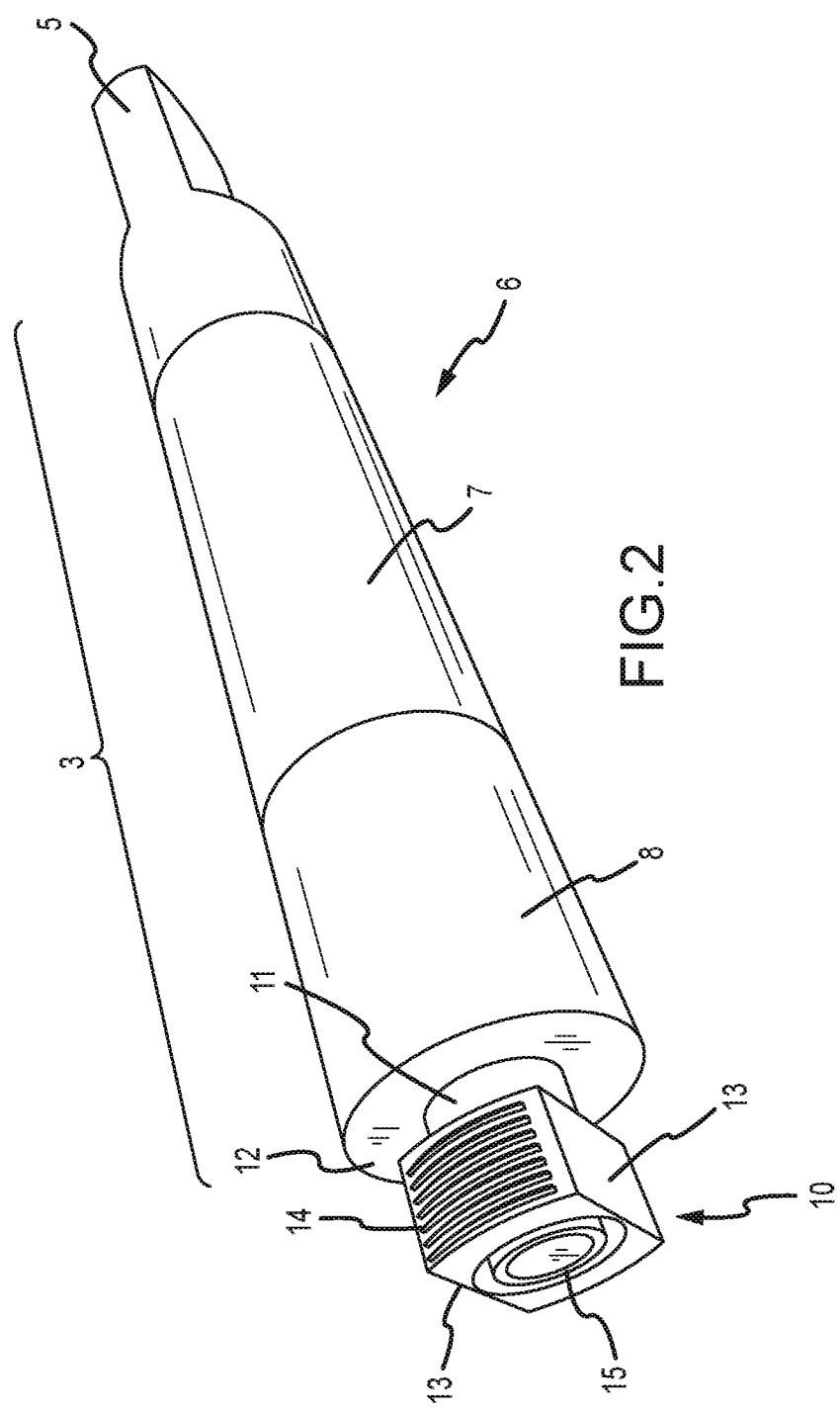
FIG. 2 is a front perspective view of a component of the vaporizer device according to the embodiment of FIG. 1.

FIG. 2 is a front perspective view of a component of the vaporizer device 2 according to the embodiment of FIG. 1. As shown, a first member 3 is provided comprising a user-interface 5 in the form of a mouthpiece for inhaling vaporized substances from the device. The first member 3 further comprises a body portion 6 having a substantially circular cross-section and including a proximal portion 7 and a distal portion 8. The member 3 preferably comprises a replaceable and/or refillable cartridge that is selectively connectable to additional device features, including the second member 4 and the battery contained therein. In certain embodiments, the proximal portion 7 comprises a clear or translucent material to enable viewing of contents of the liquid cartridge disposed within the device. In preferred embodiments, the distal portion 8 comprises an atomizer device wherein contents from the proximal portion 7 are conveyed to the atomizer device. Contents are vaporized by the atomizer or heating element, and gas or vapor is returned through a flow path provided in the proximal portion by an airflow induced by a user through the user-interface 5.

As further shown in FIG. 2, a first connector 10 comprising a male extension is provided at an end of the first member 3. In addition to providing a mechanical connection between the first member 3 and the second member 4, the male extension 10 also provides an electrical contact or connection to transmit current between a rechargeable battery provided in the second member 4 and the atomizer provided in the first member 3. The depicted embodiment comprises a male extension 10 with an annular contact member 15 for communicating with a battery device via a complimentary contact positioned at the proximal end of the second member 4. The male extension 10 further comprises first and second threaded portions 14 which are in opposing relationship and separated by two substantially planar and parallel portions 13. The threaded portions 14 comprise a radius of curvature and an arc that terminate on either end at an intersection with the planar portions 13. Accordingly, a non-circular male threaded member or connector is provided that is suitable for being received within female members having continuous or non-continuous threads and which may have a circular or non-circular aperture. As a result, the non-circular male threaded member is compatible with both existing or legacy female connectors as well as female connectors non-circular apertures as a mechanism for controlling compatibility.

Figure 3:
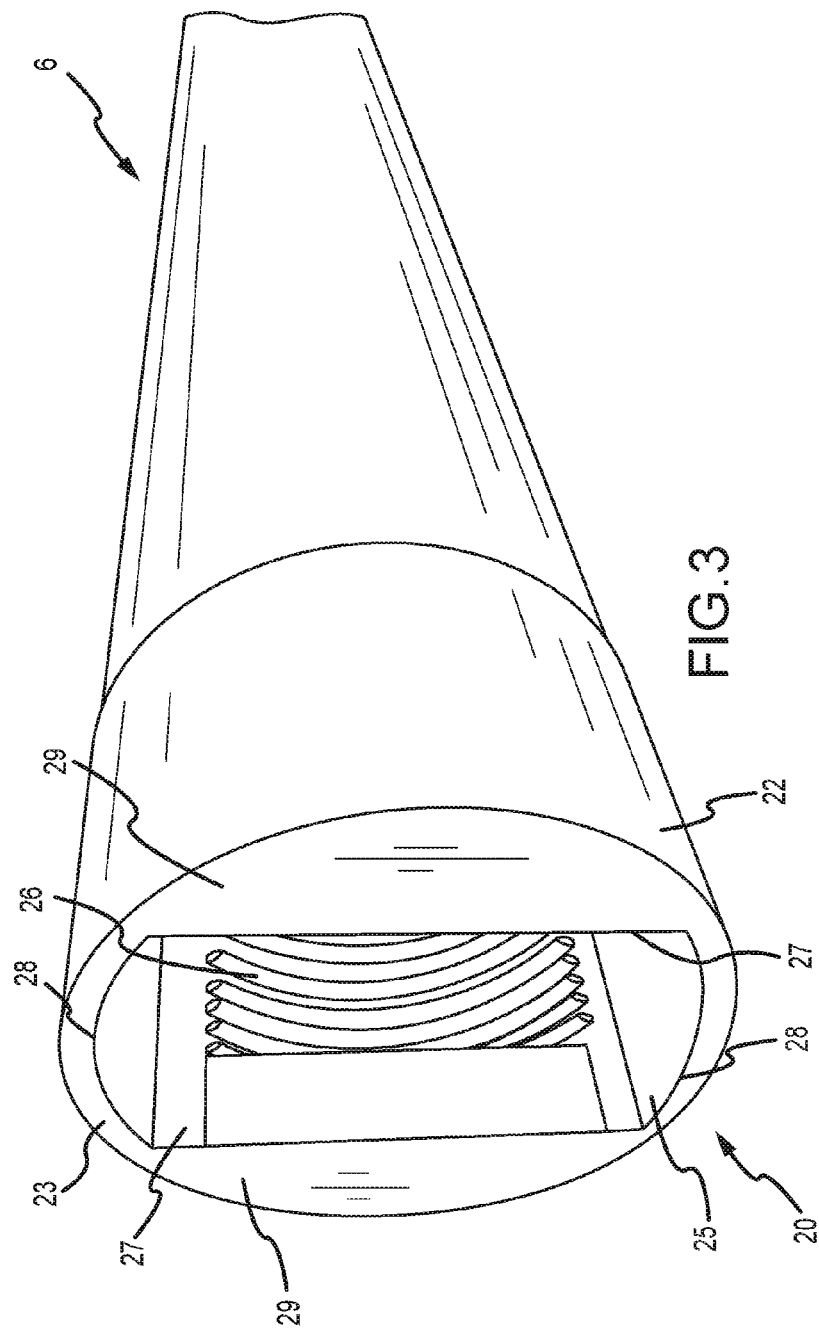
FIG. 3 is a detailed perspective view of a component of a vaporizer device according to the embodiment of FIG. 1.

FIG. 3 is a detailed perspective view of a second member 4 of a vaporizer device 2 according to a preferred embodiment. The second member 4 comprises a first end 20 that is adapted to receive a male member 10 as shown and described herein. The first end 20 comprises a second connector 22 having an aperture 25 of non-circular configuration. First and second female threaded portions 26 are provided on an interior surface of the second connector 22, with an angle and pitch corresponding to the threads 14 of the male extension 10. The aperture 25 comprises a preferred geometry including first and second parallel sidewalls 27, and first and second arcuate portions 28 provided therebetween. The aperture 25 comprises a width between the sidewalls 27 that is adapted to receive and permit passage of a width of the male member between the planar portions 13 of the male member 10. However, the aperture 25 as shown and described will prevent a legacy or conventional, circular male threaded portion of a cartridge or similar device from being connected to the second connector 22 of the second member 4. The first end 20 of the second member 4 further comprises a substantially flush surface 29 external to the aperture 25, the surface 29 adapted to rest flush against the annular surface 12 of the first member 3 when the device is assembled.

Figure 4:
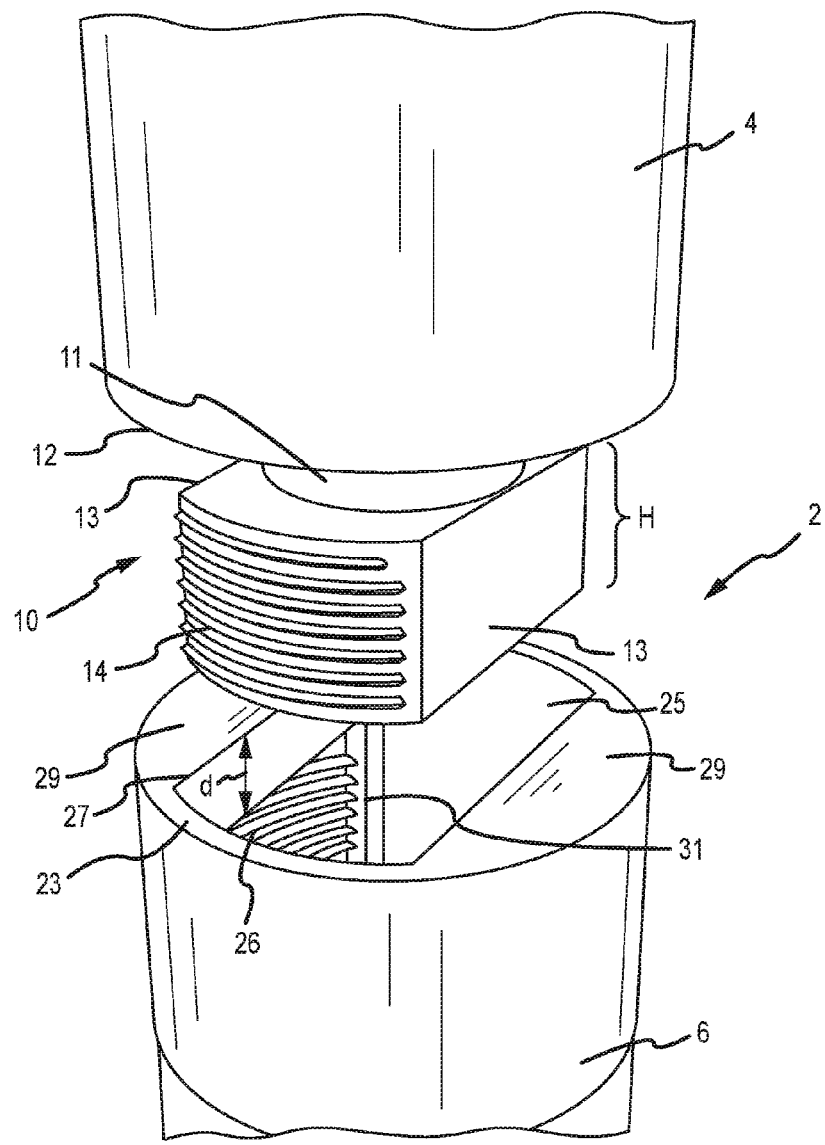
FIG. 4 is a detailed perspective view of components of a vaporizer device according to the embodiment of FIG. 1.

FIG. 4 is a detailed perspective view of the first and second members 3, 4 according to the embodiment of FIG. 1 and showing the members prior to connection and assembly of the device. As shown, the first member 3 comprises a male extension 10 adapted to be received within the female connector 22 of the second member 4. An aperture 25 provided on the second member 4 is sized to receive the outer dimensions of at least a portion of the male extension 10. The male extension 10 comprises opposing threaded portions 14 and opposing planar portions 13. The opposing planar portions 13 are adapted to be received within the aperture 25 which comprises a depth "d" extending into the second member 4. The male extension 10 comprises a height "H". To assemble the device, the male extension 10 is inserted into the female connector 22 of the second member 4. Once the height H of the male extension 10 has been inserted past the depth d of the aperture 25, the threads 14 of the male extension 10 are engaged with the threads 26 of the second connector 22 and the device may be rotated in order to secure the first and second members. Engagement of the two components is completed when the annular surface 12 of the first member 34 is brought into contact with the surface 29 of the inwardly extending flanges 24 extending from the annular ring or wall 23 of the second member 4. In various embodiments, the threads 14 of the male extension 10 and the female threads 26 of the second member 6 comprise corresponding thread pitches, wherein the engagement of the threads 14 and the female threads 26 enable rotation of the first member 3 and the second member 4 relative to each other. Engagement of the two components 3, 4 is complete when the components have been rotated and planar surfaces 12, 29 of the same have been brought into contact. In alternative embodiments, and as shown in FIG. 4, the opposing threads 14, 26 comprise cammed surfaces adapted to allow for a specific amount of rotation between the first member 3 and the second member 4. The second member 4 comprises a stop 31, which is operable to be provided in contact with an edge of the male portion 10. In such embodiments, a predetermined amount of rotation (e.g. 90 degrees, or 180 degrees) completes a connection between the first member 3 and the second member 4. In such embodiments, rotation past a certain point is not possible, as opposed to continuously threaded members of other embodiments that allow for continued rotation and/or continued application of torque between the two components 3, 4.

Electrical contact and connection between the first member 3 and the second member 4 preferably occurs prior to complete engagement of the two components 3, 4. In other words, it is not necessary that the first member 3 and the second member 4 be completely engaged or interconnected in order to allow for device operation. Various electrical contacts may be provided within the members 3, 4, including proximal to the periphery of the male extension 10 and/or the first end 20 of the second member 4. In the embodiment of FIG. 4, it is contemplated that securing the first member 3 and second member 4 comprises only a quarter turn (or 90 degree turn). In alternative embodiments, it is contemplated that the female threads 26 extend around 360 degrees of an internal surface of the second connector 22 to enhance engagement and securing of the members.

Figure 5:
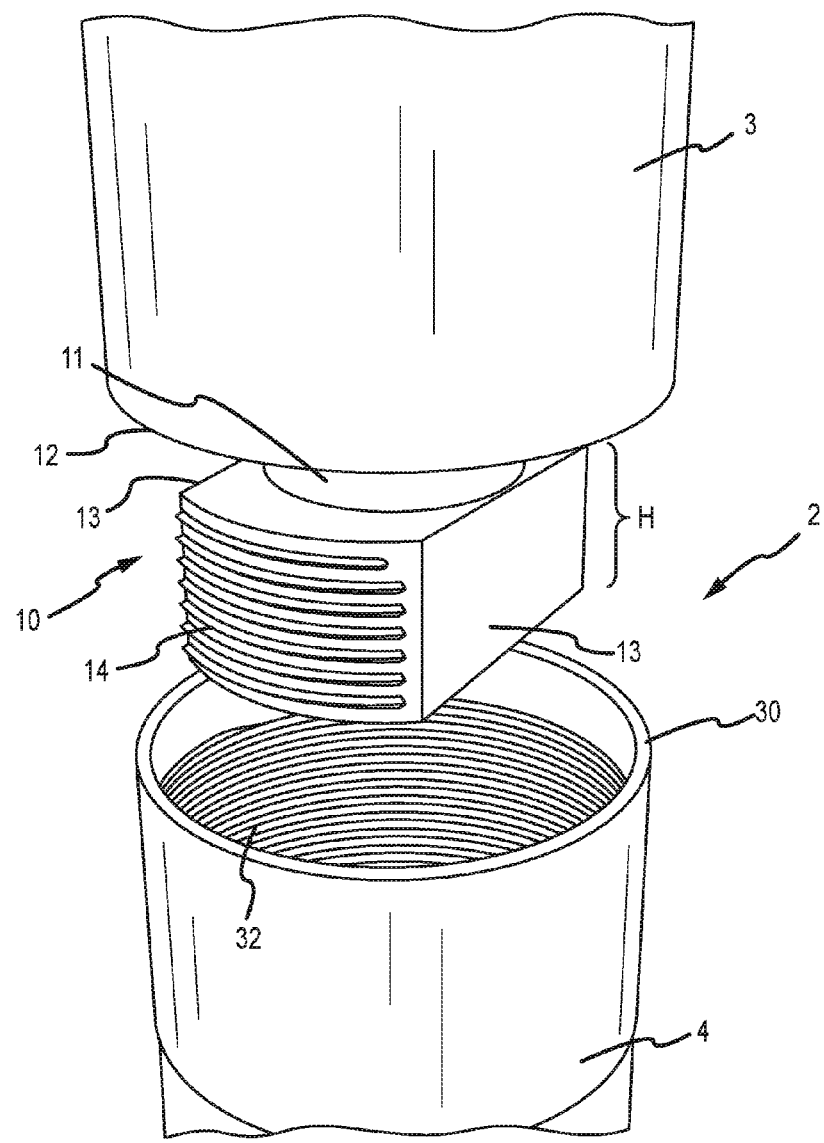
FIG. 5 is a detailed perspective view of components of a vaporizer device according to one embodiment.

FIG. 5 is a perspective view of first member 3 according to one embodiment of the present disclosure being provided in connection with a female portion 30 comprising a known, continuous circular female thread 32. As shown, the male extension 10 of the first member 3 comprises threads 14 that are adapted to mate with the female thread 32 even though the threads 14 do not comprise complete 360 degree threads. It will further be recognized, however, that the female threaded portion 26 and aperture 25 of FIGS. 1-4 will not receive a male threaded member that is a continuous, circular member. It will be recognized that although the female thread 32 of the embodiment provided in FIG. 5 is operable to receive a legacy or conventional male threaded comprising threads extending 360 degrees around an outer surface of a cylindrical male member, the male member 10 of the present invention is also capable of communicating with and connecting with the female portion 30 of FIG. 5. Thus, various embodiments of the present disclosure comprise a male threaded member 10 that can be connected to a plurality of different devices.

While various embodiments of the system have been described in detail, it is apparent that modifications and alterations of those embodiments will occur to those skilled in the art. It is to be expressly understood that such modifications and alterations are within the scope and spirit of the present disclosure. Further, it is to be understood that the phraseology and terminology used herein is for the purposes of description and should not be regarded as limiting. The use of "including," "comprising," or "having" and variations thereof herein are meant to encompass the items listed thereafter and equivalents thereof, as well as, additional items.

What is claimed is:

1. An electronic vaporizer device for vaporizing inhalants, the device comprising:
    a first member comprising a mouthpiece and an elongate body portion extending therefrom;
    a second member comprising a proximal end, a distal end and an elongate length extending between the proximal end and the distal end;
    the first member and the second member comprising selectively connectable components wherein the proximal end of the second member is connectable to the first member at an end opposing the mouthpiece;
    at least one of the first member and the second member comprising a male threaded member having a non-circular outer perimeter comprising opposing threaded portions and opposing planar portions, the opposing threaded portions comprising a first externally threaded portion and a second externally threaded portion, and the opposing planar portions comprising a height;
    at least one of the first member and the second member comprising a female member, the female member comprising a slotted aperture for receiving the male threaded member, the slotted aperture comprising a depth and wherein the depth is less than the height of the opposing planar portions of the male threaded member;
    the female member comprising first and second female threaded portions recessed with respect to the female member, the female threaded portions being spaced apart and provided in opposing relationship and wherein an entirety of the height of the opposing planar portions must be inserted through the slotted aperture to engage the male threaded member with the female threaded portions.

2. The electronic vaporizer device of claim 1, wherein the male threaded member is provided as an extension of the first member.

3. The electronic vaporizer device of claim 1, wherein the non-circular outer perimeter comprises a first arc and a second arc separated by the opposing planar portions.

4. The electronic vaporizer device of claim 1, further comprising a rechargeable battery provided in at least one of the first member and the second member.

5. The electronic vaporizer device of claim 1, further comprising an electrical contact provided on the second member.

6. The electronic vaporizer device of claim 1, wherein the first member comprises a replaceable cartridge with an interior volume for housing material to be vaporized.

7. An electronic vaporizer device for vaporizing inhalants, the device comprising:
    a first member comprising a mouthpiece and an elongate body portion extending therefrom;
    a second member comprising a proximal end, a distal end and an elongate length extending between the proximal end and the distal end;
    the first member and the second member comprising selectively connectable components wherein the proximal end of the second member is connectable to the first member;
    the first member comprising a male threaded member having a non-circular outer perimeter, the male threaded member comprising a first externally threaded portion and a second externally threaded portion, the first externally threaded portion and the second externally threaded portion provided in opposing relationship and having a radius of curvature;
    the second member comprising a pair of inwardly extending opposing flanges at least partially defining a slotted aperture for receiving the male threaded member, and a female threaded member;
    the inwardly extending opposing flanges comprising a depth;
    the female member comprising first and second threaded portions being spaced apart and recessed within the second member relative to the slotted aperture, the first and second threaded portions adapted to receive and engage the first externally threaded portion and the second externally threaded portion of the male threaded member when the male threaded member is inserted through the slotted aperture.

8. The electronic vaporizer device of claim 7, further comprising a rechargeable battery provided in at least one of the first member and the second member.

9. The electronic vaporizer device of claim 7, further comprising an electrical contact provided proximal the proximal end of the second member.

10. The electronic vaporizer device of claim 7, wherein the first member comprises a replaceable cartridge with an interior volume for housing material to be vaporized.

11. The electronic vaporizer device of claim 7, wherein the inwardly extending opposing flanges comprise parallel sidewalls.

12. The electronic vaporizer device of claim 7, wherein the slotted aperture comprises a width is larger than a width of the male threaded member.

13. An electronic vaporizer device for vaporizing inhalants, the device comprising:

a first member comprising an elongate body portion;

a second member comprising a proximal end, a distal end and an elongate length extending between the proximal end and the distal end;

the first member and the second member comprising selectively connectable components;

the first member comprising a first externally threaded portion and a second externally threaded portion, the first externally threaded portion and the second externally threaded portion provided in a spaced apart arrangement and on opposite sides of the first externally threaded portion;

each of the first and second externally threaded portions comprising an arc, wherein each of the arcs terminate at an intersection with a substantially planar surface, and wherein the first and second externally threaded portions are spaced apart by a length of the substantially planar surface;

the second member comprising an aperture for receiving at least a portion of the first member, and a female threaded member;

the aperture comprising a width extending between two opposing planar sidewalls comprising a depth, the width arranged to receive and permit passage of a width of the first member;

the female threaded member comprising first and second threaded portions being recessed relative to the aperture, spaced apart and provided in opposing relationship, the first and second threaded portions adapted to receive and engage the first externally threaded portion and the second externally threaded portion of the male threaded member; and wherein a first end of the second member comprises a substantially flush surface external to the aperture that is operable to rest flush against a portion of the first member when the device is assembled.

14. The electronic vaporizer device of claim 13, further comprising a rechargeable battery provided in at least one of the first member and the second member.

15. The electronic vaporizer device of claim 13, further comprising an electrical contact provided proximal the proximal end of the second member.

16. The electronic vaporizer device of claim 13, wherein the first member comprises a replaceable cartridge with an interior volume for housing material to be vaporized.

17. The electronic vaporizer device of claim 13, wherein the opposing planar sidewalls comprise parallel sidewalls.

18. The electronic vaporizer device of claim 13, wherein the first externally threaded portion and the second externally threaded portion are separated by a pair of opposing planar sidewalls.

19. The electronic vaporizer device of claim 18, wherein a distance provided between the pair of opposing planar sidewalls is sized to be received within the width of the aperture of the second member.

20. The electronic vaporizer device of claim 13, wherein the aperture of the second member comprises a non-circular aperture.

* * * * *